United States Patent [19]

Cotter

[11] Patent Number: 4,611,770
[45] Date of Patent: Sep. 16, 1986

[54] AUTOMOTIVE SEAT BELT RETRACTOR WITH ANTI-CINCH DEVICE

[75] Inventor: Patrick J. Cotter, Plymouth Township, Wayne County, Mich.

[73] Assignee: Ford Motor Company, Dearborn, Mich.

[21] Appl. No.: 739,400

[22] Filed: May 30, 1985

[51] Int. Cl.[4] ............................................. B60R 22/34
[52] U.S. Cl. ............................................. 242/107.4 D
[58] Field of Search ................ 242/107.4 D, 107.4 R, 242/107.4 A, 107.4 B, 107.7; 280/807; 297/476

[56] References Cited

U.S. PATENT DOCUMENTS 3,945,586 3/1976 Higbee et al. ............... 242/107.4 D

FOREIGN PATENT DOCUMENTS 3022756 3/1982 Fed. Rep. of Germany ... 242/107.4 D

Primary Examiner—John M. Jillions
Attorney, Agent, or Firm—Daniel M. Stock; Clifford L. Sadler

[57] ABSTRACT

A motor vehicle seat belt retractor assembly is provided in which a locking pawl is carried with a rotatable saddle member to permit limited movement when the pawl is lockingly engaged with a ratchet tooth in the retractor.

8 Claims, 2 Drawing Figures

AUTOMOTIVE SEAT BELT RETRACTOR WITH ANTI-CINCH DEVICE

BACKGROUND OF THE INVENTION

The present invention relates generally to automatic locking retractors for automotive seat belts and more particularly to anti-cinch devices included with such retractors for permitting a certain amount of free play in the operation of the retractor during normal use.

While the prior art is replete with examples of so-called automatic locking retractors, that is, seat belt retractors which are effective to prevent substantial further extension of the seat belt webbing after the belts are donned by the wearer, the prior art automotive locking retractors typically have one operational limitation which, in certain circumstances, can make their use inconvenient or uncomfortable. This is the "cinching" effect encountered when the belt is retracted during use to a tighter position. This can occur during slight movement of the wearer in the seat of a vehicle, particularly compressing movement against soft seat cushions. Automatic locking retractors typically have relatively sensitive locking mechanisms which permit protracting or extending movement of the belt to take place while the belt is being donned and which provide for locking the belt against further protraction after the belt is retracted to a comfortable position with respect to the wearer's body. Such locking may be effected by pawl and ratchet type mechanisms in which a pawl lockingly engages with a ratchet tooth during protracting movement once the lock is effected. In these retractors, the retracting movement of the belt is always permitted and is in fact urged by a return spring in a webbing take-up reel of the mechanism. When shifting movement of the occupant, as against a soft seat cushion, occurs in the direction which will permit such retracting movement while the belt is being worn, the possibility exists that the pawl and ratchet mechanism may be repositioned to a new tighter position as a result of the unplanned retracting movement.

SUMMARY OF THE INVENTION

It is an object of the present invention to address the tendency of automatic locking retractors to reset to tighter positions during certain movement of the wearer and to provide a mechanism for preventing this tightening readjustment over a significant range of movement, such as the permitted belt travel of one inch, as permitted by motor vehicle safety standards set by the government of the United States. This object is accomplished in providing a pawl and ratchet actuated automatic locking retractor with a spring loaded, saddle mounted pawl actuating element that is pivotally mounted to the retractor take-up reel to ensure substantial free play movement of the belt and consequently the locking pawl prior to locking actuation of the retractor.

BRIEF DESCRIPTION OF THE DRAWING

Appreciation of this object and understanding of the preferred embodiment in which it is achieved may be realized by reading the following specification with reference to the accompanying drawing in which.

DESCRIPTION OF A PREFERRED EMBODIMENT

Figure 1:
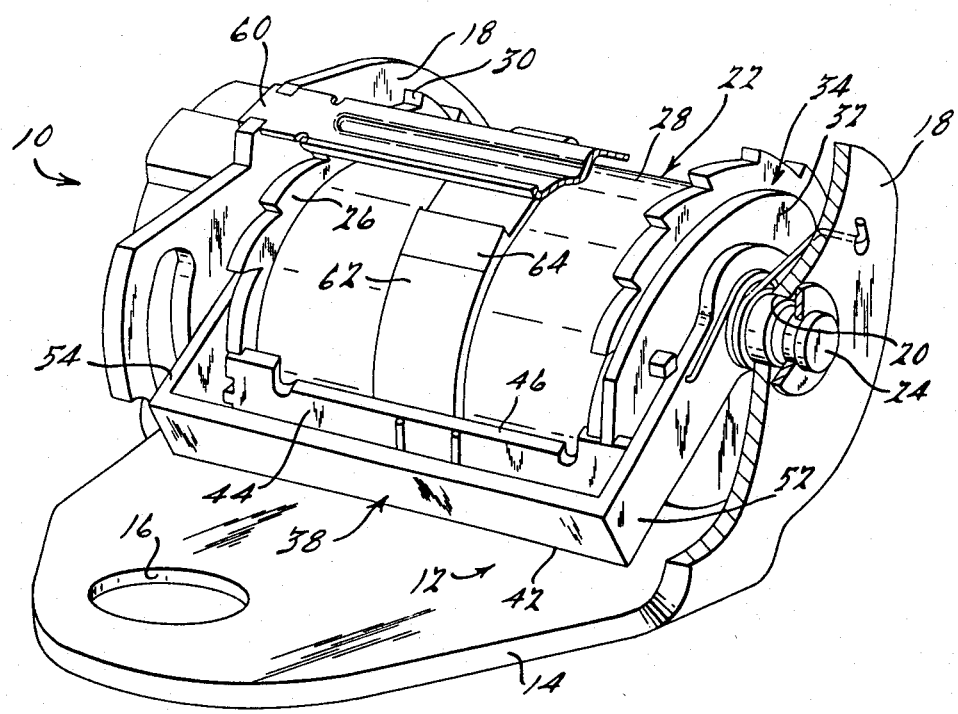
FIG. 1 is a perspective view, partially cross-sectioned, of an automatic locking retractor according to the present invention.

Turning now to the drawings, and in particular to FIG. 1 thereof, retractor assembly 10 having an improved anti-cinch device 12 is shown in the perspective view. The retractor assembly 10 conventionally includes a base member 14 generally formed as a sheet metal stamping, having apertures such as that designated at 16 for attachment to the vehicle and having upstanding legs as indicated at 18, including aligned through apertures 20 for rotatably supporting a take-up reel assembly indicated generally at 22 for storing and paying out seat belt webbing in a known manner. In addition, the retractor assembly 10 includes a modified lock-up mechanism which comprises the anti-cinch device 12 of this invention. The spool 24 of the take-up reel assembly 22 carries two ratchet plates 26 spaced at the sides of the webbing 28 carried on the spool 24. The spacing of the teeth 30 of the ratchet plates 26 naturally establishes the dimensional rotational frequency with which fixed stopping engagement can be effected with the spool 24.

Immediately outboard one of the ratchet plate members 26 is a clutch plate 32 which is held in conventional spring loaded annular frictional engagement against the adjacent ratchet plate member 26. This clutch plate 32 is mounted for rotatable movement with respect to the retractor spool 24 and for rotation with it during frictional engagement of the clutch plate 32 with the outer face 34 of the ratchet plate member 26. On the outboard side of the clutch plate 32, a pair of upstanding abutments or projections 36 are formed in spaced apart relationship to loosely receive a saddle assembly 38 permitting certain relative rotational movement therebetween which is also mounted for rotation with respect to the take-up spool 24. A spring member 40 is operatively engaged between saddle assembly 38 and the frame member 18 to control movement of saddle assembly 38 as will be hereafter described.

The saddle assembly 38 comprises a generally U-shaped saddle member 42 through which mounting to the retractor spool 24 is effected. Carried on the saddle member 42 proximate its end remote from its rotative connection with the spool 24 is a locking pawl member 44 comprising a generally flat member having a toothed engaging end 46 for cooperation with the teeth 30 of the ratchet members 26. A rectangular tab portion 48 on each end of the pawl member 44 is received in a double sectored aperture 50 formed in each leg 52, 54 of the saddle member 42 to enhance engaging motion. A spring member 56 urges the pawl member 44 in an engaging direction in which its engaging tooth 46 tends to align itself with teeth 30 of the ratchet plate 26. Rotative motion of the saddle assembly 38 in one direction is limited by stop portions 58 formed on the frame member 14 and in the other direction by a plate-like tie bar member 60 fixedly carried on the frame 14 to span the upstanding legs 18. In a central portion of the tie bar 60, provision is made for attachment of a plastic webbing follower member 62, having a cam surface 64 formed thereon for maintaining the pawl member 44 away from an engaging position when a predetermined amount of webbing 28 is stored on the spool 24 of retractor assembly 10.

OPERATION OF THE PREFERRED EMBODIMENT

Figure 2:
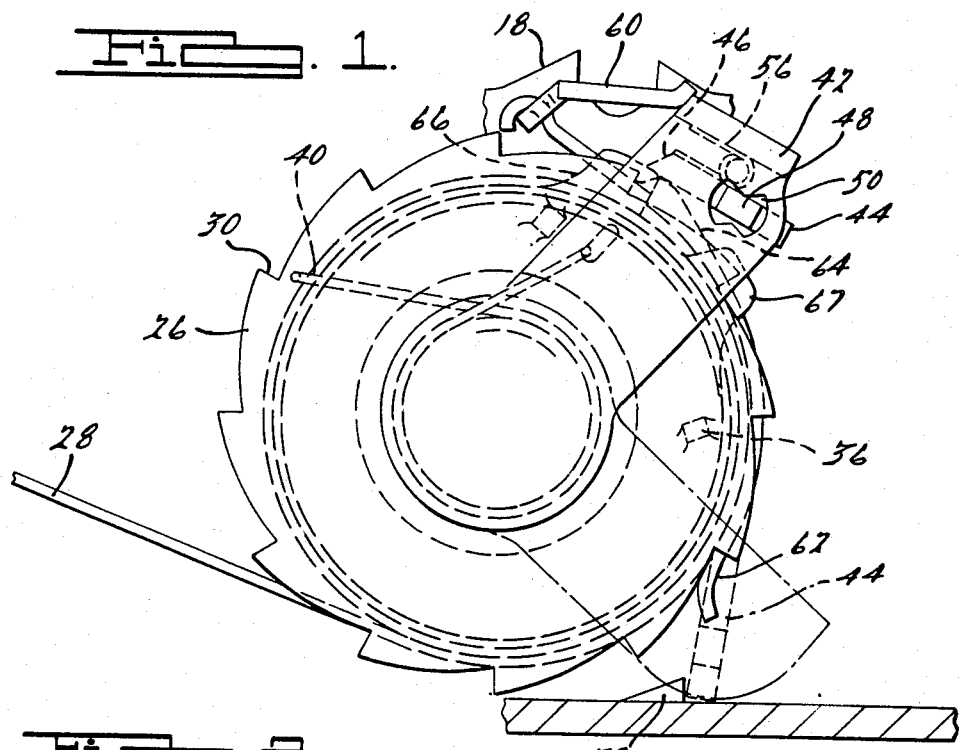
FIG. 2 is a partial cross-sectional view of the locking retractor the present invention illustrating the position of the saddle mounted pawl in its extreme operating positions.

The operation of the anti-cinch device of the present invention can best be understood by initial reference to FIG. 2. In the solid line position shown in FIG. 2, the saddle assembly is at rest against the tie bar 60 and the webbing follower cam 64 positions the pawl 44 in a disengaging position. Upon protracting webbing 28 from the retractor assembly 10, the spool 24 rotates clockwise as viewed in FIG. 2 without engagement of the pawl 44 with teeth 30 of the ratchet plates 26. When sufficient webbing 28 has been withdrawn, locking will be effected upon relatively slight retraction of the webbing 28, the clutch plate 32 having lobes thereon indicated at 66, 67 for preventing engaging movement of the pawl 44 which movement is urged by operation of the spring 56 until such retraction takes place. It is to be understood that frictional engagement of the clutch 32 with the ratchet plate 26 tends to position the clutch plate 32 in the solid line position shown in FIG. 2 during adjusting protraction of the webbing 28. Once the lock is effected and the ends of the seat belt are joined together by the passenger in the conventional manner through a buckle or the like (not shown), further protracting movement of webbing 28 will be resisted by engagement of the pawl 44 with the teeth 30, since the teeth 30, through ratchet plate members 26, are mounted for rotation on the spool 24, which conventionally includes a retracting spring. Only this relatively light load which is added to the load imposed by the saddle spring 40, however, is imposed on the wearer during certain movement while the seat belt is worn because the protracting movement results in the ratchet plates 26 driving the saddle from a position such as that shown in full line in FIG. 2 toward the dotted line position of FIG. 2 where the pawl member 44 engages stops 58 in the frame 14 which is attached to the vehicle. The saddle spring load is set to exceed the frictional load imposed by the clutch 32. In this arragnement floating movement of the saddle 38 with the clutch 32 is permitted in a manner in which the saddle 38 tends to remain substantially against the bar 60 during adjustment and is free to move after lock-up is achieved away from this position. This relatively free movement between a position in which a ratcheting lock is effected between the pawl 44 and teeth 30 and the point at which the pawl member 44 is engaged with the stops 58 provides a comfort zone or anti-cinch zone in which protracting movement and locked retracting movement of the belt is permitted. Construction of the retractor assembly 10 of the invention by providing for substantial rotation on the order of 90° between the position in which the saddle engages the tie bar 60 and that in which it engages the frame stop 58 permits such movement below the legal allowable maximum of 1.00 inches belt travel. When the belt is released from its buckled position, clockwise movement of the spool 24 results in corresponding directional urging of the saddle 38, and projections 36 of clutch plate 32 finally position the clutch plate 32 with respect to the pawl member 44 so that the lobe 67 moves pawl member 44 away from engagement to prevent ratcheting noise.

It should be clear to those skilled in the art from the foregoing description of the invention anti-cinch device that the spacing of projections 36, lobes 66, 67 and teeth 30 can be conveniently arranged to enhance pawl engagement and disengagement sensitivity so that acceptable automatic locking retractor operation can be achieved while taking advantage of the movement freedom permitted with pawl and tooth engaged that is afforded by the mounting of the pawl member 44 on the saddle 38 for floating movement with the clutch plate 32.

Only one embodiment of the present invention has been disclosed. Others may be possible without departing from the scope of the appended claims.

I claim:

1. A retractor mechanism for a motor vehicle seat belt of the automatic locking type having a pawl means selectively lockingly engageable with ratchet means upon certain retraction of the belt from a protracted position selected by a user of the belt, the retractor mechanism including a frame portion, a belt take-up reel assembly operatively mounted on the frame portion through a spool member and having friction clutch means operatively engaged therewith, characterized in that an anti-cinch device is provided for permitting certain movement of the belt while locking engagement of the pawl and ratchet is effected, the device comprising:

a saddle member rotatively mounted on the spool member and engageable with the clutch means for limited rotation therewith, a pawl member mounted on the saddle member for selective engagement with the ratchet means, and including a spring member carried with the saddle member in engagement with the pawl member to urge the pawl member toward engagement with the ratchet means, tie bar means mounted on the frame for limiting rotative saddle movement in one direction, and frame stop means for limiting rotative saddle movement in the other direction.

2. A motor vehicle seat belt assembly having an automatic locking retractor for the seat belt, the retractor comprising, a frame mounted to a portion of the vehicle, a take-up reel assembly having a spool rotatively mounted on the frame and including means for protracting and retracting webbing mounted on the spool under the urging of spring means acting in the rotative direction effecting retraction, ratchet plate means having ratchet teeth formed thereon, carried for rotation with the spool at the outer sides of the webbing, clutch plate means having lobes formed thereon extending radially outwardly beyond the ratchet teeth, a pair of spaced abutments formed on the clutch plate, a saddle assembly rotatably mounted on the spool, having a pawl member mounted on a portion thereof remote from the spool and resiliently urged for selective engagement with the ratchet teeth upon movement of the pawl member to a position out of circumferential registration with said clutch plate lobes, the saddle assembly received between and drivingly engageable with the clutch plate abutments, and first and second stop means operatively associated with the frame to restrict rotative movement of the saddle assembly with respect to the frame.

3. A seat belt assembly as defined in claim 2 and further comprising saddle return spring means operatively engaged between the frame and the saddle assembly for urging the saddle assembly in one rotative direction.

4. A seat belt assembly as defined in claim 3 wherein the rotative force imposed on the saddle assembly by the saddle return spring exceeds the rotative force imposed on the saddle by the clutch plate means.

5. A seat belt assembly as defined in claim 2 and further comprising means for preventing said selective engagement until certain protracting movement is effected.

6. A seat belt assembly as defined in claim 5 wherein said engagement preventing means comprises a webbing follower member pivotally mounted on one of the stop means and including a cam engageable with said pawl member to urge said pawl member out of engagement in response to the storage of a predetermined amount of webbing in said take-up reel assembly.

7. A seat belt assembly as defined in claim 2 wherein said saddle assembly comprises a generally U-shaped saddle member rotatably mounted on the spool and having leg portions spanning the take-up reel assembly and an outboard portion remote from the spool connecting the legs.

8. A seat belt assembly as defined in claim 7 wherein a pair of aligned double sectored through apertures are formed in the legs proximate the outboard portion and the pawl member is formed as a plate-like member having tab portions received in the apertures to permit limited rotative movement of the pawl member with respect to the saddle member for facilitating engaging and disengaging movement of the pawl member with respect to the saddle member.

* * * * *